Nov. 23, 1954     A. G. HUPP     2,695,071
POWER ARM FOR LAWN AND GARDEN IMPLEMENTS
Filed July 5, 1949     3 Sheets-Sheet 1
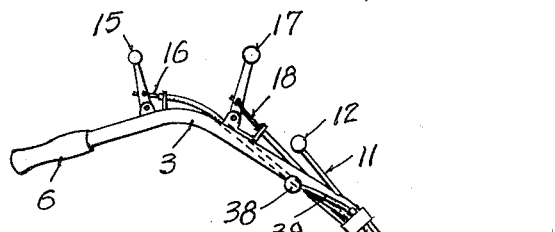
FIG.1.
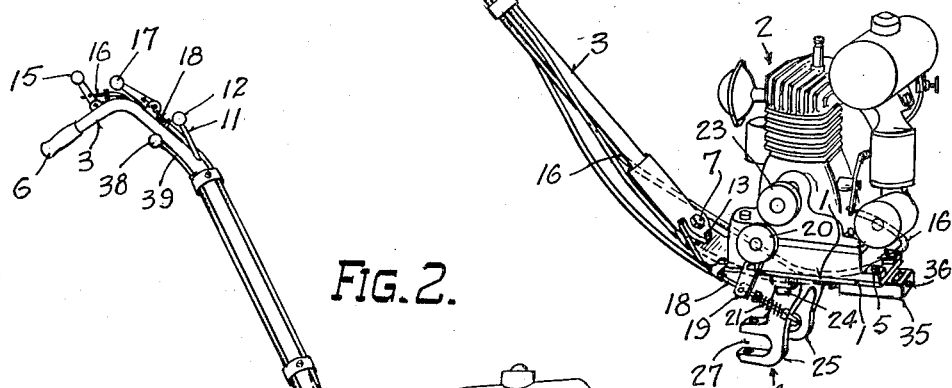
FIG.2.
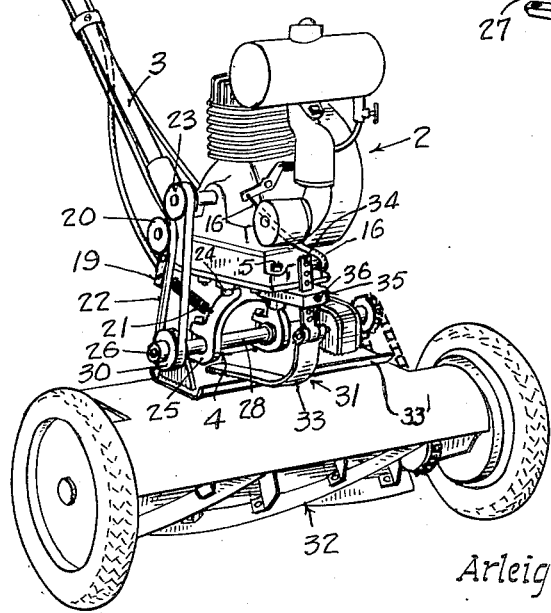
Arleigh G. Hupp
INVENTOR.
BY *Andrus & Sceales*
ATTORNEYS.

Nov. 23, 1954  A. G. HUPP  2,695,071
POWER ARM FOR LAWN AND GARDEN IMPLEMENTS
Filed July 5, 1949  3 Sheets-Sheet 2
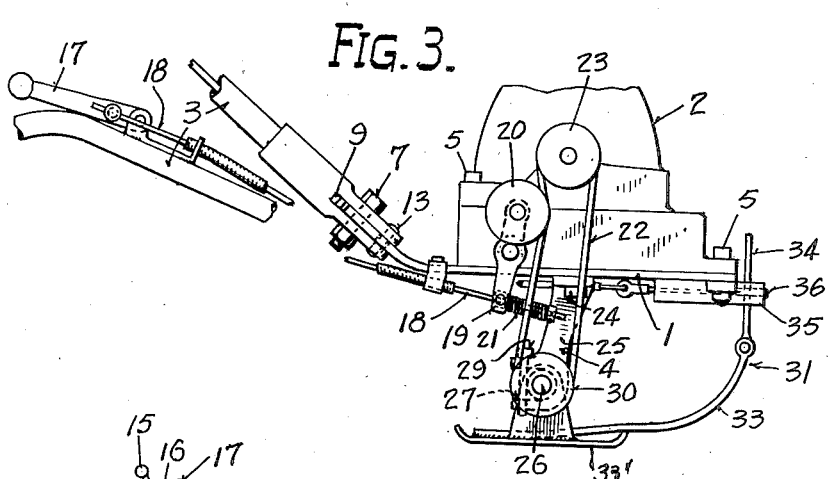
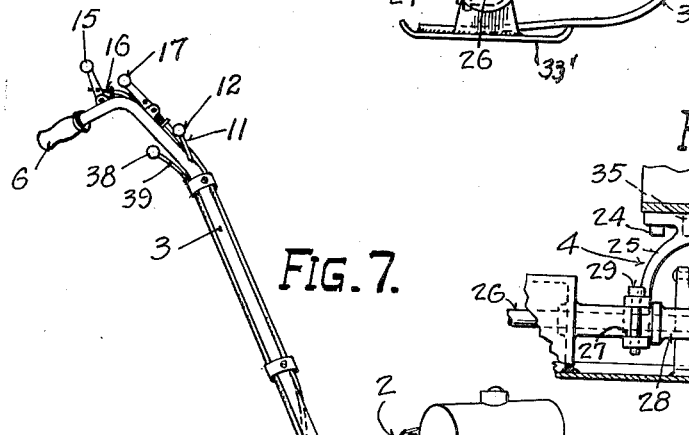
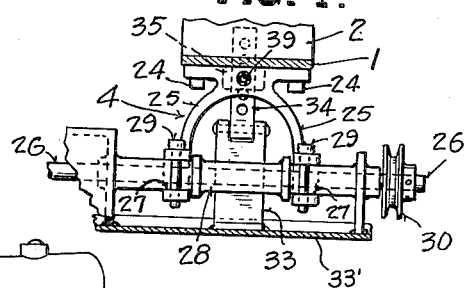
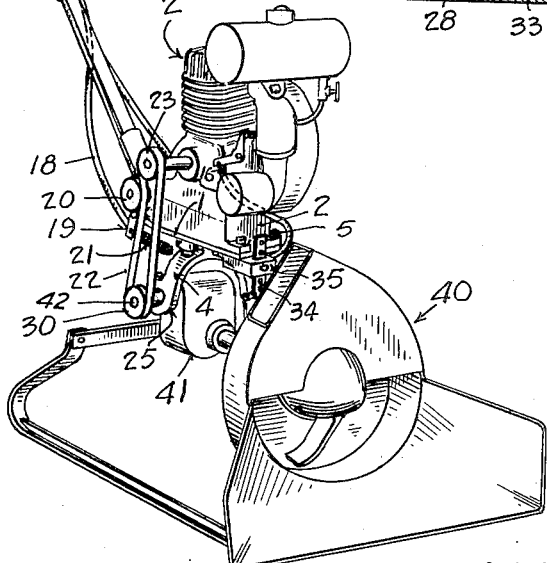
Arleigh G. Hupp
INVENTOR.
BY Andrus & Scales
ATTORNEYS.

Nov. 23, 1954    A. G. HUPP    2,695,071
POWER ARM FOR LAWN AND GARDEN IMPLEMENTS
Filed July 5, 1949    3 Sheets-Sheet 3

Arleigh G. Hupp
INVENTOR.

BY *Andrus & Sceales*
ATTORNEYS.

United States Patent Office 2,695,071
Patented Nov. 23, 1954

2,695,071

POWER ARM FOR LAWN AND GARDEN IMPLEMENTS

Arleigh G. Hupp, Milwaukee, Wis.

Application July 5, 1949, Serial No. 103,018

5 Claims. (Cl. 180—19)

This invention relates to a power arm for implements and to the driving of various garden and lawn implements such as tillers, rotary hoes, snow-plows, mowers, planters and the like.

In general, the invention provides a detachable power unit for such an implement and which is supported upon the implement, and embodies an engine with a control arm that is utilized by the operator for guiding the implement in its operation.

One of the objects of the invention is to provide such a power unit which can be readily assembled with and detached from various small implements of the class referred to.

Another object is to provide a simplified control mechanism for a power arm unit.

The invention is illustrated in the accompanying drawings in which:

Figure 1 is a perspective view of a power arm unit embodying the invention;

Fig. 2 is a perspective view showing the power arm attached to a lawn mower;

Fig. 3 is an enlarged detail view showing the attaching means for the power arm and lawn mower illustrated in Fig. 2;

Fig. 4 is a detail rear view of the hitch shown in Fig. 3;

Fig. 7 is a perspective view showing the attachment of the power arm to a snowplow.

Figure 5:
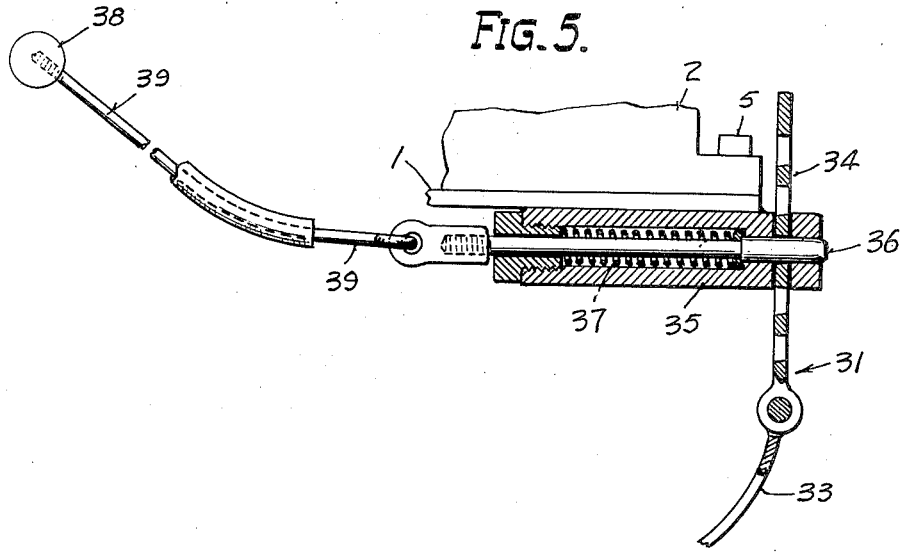
Fig. 5 is a detail sectional view of the hitch adjustment mechanism.
Figure 6:
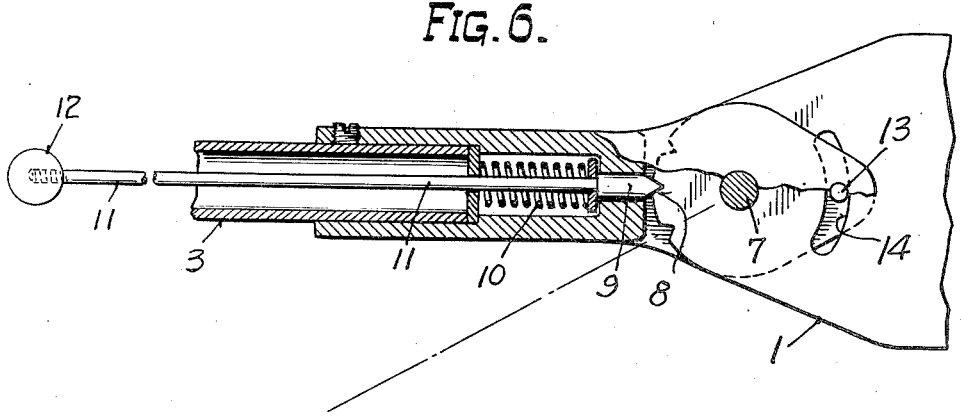
Fig. 6 is a detail view of the handle offset adjustment.

The power arm illustrated comprises a base 1, an engine 2 securely mounted upon the base, a guiding handle 3 secured to the rear of the base, and a hitch 4 for attaching the base to any selected implement.

The base 1 consists of a horizontal plate of sufficient size to support the engine block and to receive the corner bolts 5 for securing the engine thereto.

The engine 2 may be any one of a number of small lightweight commercial engines or power units such as a one and a half or two horse power two or four cycle gasoline engine. Where suitable electric power is available an electric motor may be utilized, and wherever the term "engine" is employed hereinafter it is understood to mean any suitable power means. The engine is securely mounted upon base 1 by means of the bolts 5.

The guide handle 3 comprises a tubular arm extending upwardly and rearwardly from base 1 and which has its upper end bent rearwardly and preferably at a slight downward angle at a height suitable for easy grasp by the average operator when walking behind the implement and power arm. A suitable rubber-cushioned grip 6 may be applied to the end of handle bar 3 for grasping by the operator.

The lower end of guide handle 3 is secured to the upwardly and rearwardly slanting rear end of base 1 by means of a pivot pin 7. A central notch 8 and two corresponding side notches disposed at about 30° therefrom are provided in the rear edge of base 1, and a pin 9 is carried by handle 3 to enter a selected notch and provide for securing the handle in any one of three positions relative to base 1. The pin 9 is operated by a spring 10 normally biasing the same into a notch and by a pull cable 11 from knob 12 on the handle 3.

The purpose of the pivotal adjustment for handle 3 lies in providing for the lateral offsetting of handle grip 6 from the path of the implement so that where the implement follows a garden row or the like the operator may walk in the next row which has not been treated by the implement. This is particularly useful in tilling and hoeing since with the lateral offset adjustment the operator need not trample upon the freshly tilled or cultivated soil.

If desired, the lower end of the handle 3 may extend beyond pivot pin 7 and be additionally connected to base 1 by means of a loose bolt 13 passing through the handle and through an arcuate slot 14 in base 1, so that the bolt secures the handle against vertical displacement relative to the base but does not interfere with the pivotal adjustment of the handle.

The guide handle 3 carries a suitable engine throttle control lever 15 at a location within easy reach of the operator and which is connected to the engine by a suitable wire cable 16 for controlling the operation and speed of the engine 2.

In addition to the engine control lever 15 the guide handle 3 carries a clutch control lever 17 which is connected by its wire cable 18 to the lever arm 19 of a belt tightening idler pulley 20 pivoted to the engine. A spring 21 on the lower end of cable 18 cushions the operation of the clutch when cable 18 is pulled to force idler 20 into engagement with the belt 22 that drives the implement from the engine drive pulley 23. The lever 17, by pulling on cable 18, to a position where the lever passes dead center effects a movement of clutch lever 19 in a direction to tighten the belt and thereby effect clutching of the drive for the implement. Release of lever 17 permits lever 19 to fall back and loosen belt 22.

The hitch 4 comprises a casting secured to the bottom of base 1 by suitable bolts or screws 24 and having one or more downwardly depending arms 25 for supporting the power arm upon a transverse shaft 26 of an implement to be driven. In the power arm illustrated the hitch 4 has two laterally spaced depending arms 25, each having a bearing in the form of a rearwardly opening slot 27 therein adapted to receive a small bushing 28 on shaft 26. Each bushing 28 is secured to the gear case and has a flange on its outer end to confine the corresponding arm 25. A pin 29 is dropped through the upper member of the rear fork of each arm to secure the same upon the bushing 28 and against removal.

Shaft 26 of the implement has a pulley 30 disposed in line with drive pulley 23 and is adapted to receive belt 22 for driving the shaft. Shaft 26 is the drive shaft for the implement and constitutes the principal means for attaching the power arm thereto.

For the purpose of preventing free tilting of the power arm relative to the implement, upon shaft 26, the hitch 4 embodies a stabilizing connection 31 between base 1 and the implement, spaced either forwardly or rearwardly from the shaft 26.

The connection 31 provides an adjustment for height of the handle 3.

In the case of the lawn mower 32 illustrated in Fig. 2, the stabilizing connection 31 comprises a rigid leaf 33 secured to the top frame 33' of the mower and having its forward end bent upwardly toward the forward end of base 1. A vertical perforated connecting strip 34 is hinged to the upper forward end of leaf 33 and extends upwardly through a hole in a bracket 35 secured to the underside of base 1.

Bracket 35 extends forwardly of base 1 to provide for free vertical adjustment of strip 34 therethrough and a pin 36 extends through the bracket and through a selected perforation in the strip to secure the latter in selected position. The pin 36 is biased outwardly by spring 37 and operated by knob 38 on handle 3 connected thereto by wire cable 39, so that the pin may be retracted from strip 34 and the height of the handle may be adjusted at any time.

The resilience of the rear end of base 1 provides for a controlled tilting of the lawn mower over rough lawns without compelling the guide handle 3 to move upwardly and downwardly in response to the tilting action of the mower. The height of the handle will want to be adjusted, however, to accommodate different operators and to compensate for changing between uphill, level and downhill operations.

The same hitch 4 is employed in securing the power arm to the snowplow 40 illustrated in Fig. 7. In this instance the downwardly depending attachment arms 25 of the hitch straddle the gear box 41 for the snow plow rotor drive and are pivotally secured upon the drive shaft 42, corresponding to drive shaft 26 of Figs. 1 to 4.

The power arm of the invention may be attached quickly to any number of various implements in the manner above described. Because the attachment is always to the transverse drive shaft of the implement, the belt 22 is the same for all drives and the clutch need not be adjusted except under unusual circumstances.

The power arm may be detached quickly from any implement merely by operating knob 38 to pull pin 36 and release bracket 35 from strip 34, and removing pins 29 to release arms 25 for removal from shaft 26.

The power arm is normally of very light weight, having very little weight in addition to the engine. Where a small one-cylinder four-cycle engine of about one horse power was employed a power arm weighing less than thirty-three pounds was constructed.

The power arm takes up very little room in a garage or implement house and may even be conveniently hung on the wall for storage purposes where the engine fuel system is constructed for angular movement without leakage.

Various embodiments of the invention may be employed within the scope of the accompanying claims.

I claim:

1. A hitch for a unitary power arm attachment for implements having a transverse shaft to be driven, comprising a hitch member secured to the base of the power arm and extending therefrom, a bearing member for said implement shaft adapted to be received by the outer end of said hitch member to provide for rocking of the power arm upon the shaft, and a stabilizing connection between the power arm base and the implement offset radially from the shaft to prevent relative rocking movement between the power arm and implement.

2. A hitch for a unitary power arm attachment for implements having a transverse shaft to be driven, comprising a hitch member secured to the base of the power arm and extending therefrom, a bearing member for said implement shaft adapted to be received by the outer end of said hitch member to provide for rocking of the power arm upon the shaft, and a stabilizing connection between the power arm base and the implement offset radially from the shaft to prevent relative rocking movement between the power arm and implement, said connection having a locking member adapted to secure the same in a selected position of adjustment to provide for an adjusted tilt between the power arm and implement.

3. A hitch for a unitary power arm attachment for implements having a transverse shaft to be driven, comprising a hitch member secured to the base of the power arm and extending therefrom, a bearing member for said implement shaft adapted to be received by the outer end of said hitch member to provide for rocking of the power arm upon the shaft, a stabilizing connection between the power arm base and the implement offset radially from the shaft to prevent relative rocking movement between the power arm and implement, said connection having a locking member adapted to secure the same in a selected position of adjustment to provide for an adjusted tilt between the power arm and implement, and a lever carried by the handle of the power arm and connected to release said locking means.

4. A unitary power arm attachment for implements having a transverse shaft to be driven, comprising an engine having a belt drive pulley, a handle having engine control means thereon and disposed to guide the implement, and a hitch adapted to receive the shaft of the implement and removably secure the power arm thereupon in tilt adjusted relation to the implement, said drive pulley being adapted to align with a driven pulley upon the implement shaft and to be spaced a predetermined distance therefrom in all tilt positions for the power arm whereby a single belt may be employed upon said pulleys for all such adjusted positions.

5. The combination of a power arm unit and an implement selected from a group of mobile lawn or garden implements, said power arm unit comprising an engine having a drive pulley, a guide handle secured to said engine and having manually operable means connected to the engine to control the latter, and a hitch comprising spaced arms rigidly secured to said engine and having aligned bearings parallel to the axis of said drive pulley and spaced therefrom; each implement of said group having a pulley and a belt adapted to be driven by said engine pulley whereby the engine is operably connected to the implement to drive the latter, spaced bearing support members fixed to said implement to receive the bearings of said power arm unit hitch and disposed in alignment coaxially with the axis of said implement pulley to support the power arm unit with respect to the implement with said pulleys in alignment and for their relative adjustment on the axis of said implement pulley, and connecting members respectively carried by said implement and power arm unit and having means for adjusting their effective length and the convenient adjustment of the guide handle on the axis of said implement pulley, said bearings and bearing support means and said members being respectively adapted for connection and disconnection whereby said power arm unit may be separately employed with any one of said group of implements.

References Cited in the file of this patent

UNITED STATES PATENTS

| Number | Name | Date |
|---|---|---|
| 2,368,290 | Donald | Jan. 30, 1945 |

FOREIGN PATENTS

| Number | Country | Date |
|---|---|---|
| 604,725 | Great Britain | July 8, 1948 |